United States Patent [19]
Cameron et al.

[11] Patent Number: 5,146,503
[45] Date of Patent: Sep. 8, 1992

[54] SPEECH RECOGNITION

[75] Inventors: Ian R. Cameron, Ipswich; Paul C. Millar, Felixstowe, both of England

[73] Assignee: British Telecommunications public limited company, London, England

[21] Appl. No.: 235,416

[22] Filed: Aug. 24, 1988

[30] Foreign Application Priority Data

Aug. 28, 1987 [GB] United Kingdom ................. 8720392
Feb. 23, 1988 [GB] United Kingdom ................. 8804201

[51] Int. Cl.⁵ ............................................... G10L 5/06
[52] U.S. Cl. ..................................................... 381/43
[58] Field of Search ................... 364/513.5; 381/36–43

[56] References Cited

U.S. PATENT DOCUMENTS

| | | | |
|---|---|---|---|
| 4,590,605 | 5/1986 | Hataoka et al. | 381/43 |
| 4,618,984 | 10/1986 | Das et al. | 381/43 |
| 4,651,289 | 3/1987 | Maeda et al. | 364/513.5 |
| 4,672,668 | 3/1987 | Kitazume et al. | |
| 4,712,243 | 12/1987 | Ninomiya et al. | 381/43 |
| 4,715,004 | 12/1987 | Kabasawa et al. | 364/513.5 |
| 4,720,863 | 1/1988 | Li et al. | 381/42 |
| 4,783,803 | 11/1988 | Baker et al. | 381/42 |

FOREIGN PATENT DOCUMENTS 2192746 11/1987 United Kingdom .

OTHER PUBLICATIONS

Iizuka, "Speaker Independent Telephone Speech Recognition", /ICASSP 1985, 1985, pp. 842–845.
Nadas et al, "Continuous Speech Recognition with Automatically Selected Acoustic Prototypes Obtained by Either Bootstrapping or Clustering", IEEE, 1981, pp. 1153–1155.
Parson, Voice and Speech Processing, pp. 199–200, 1986, McGraw-Hill, Inc.
IEEE Transactions on Acoustics, Speech and Signal Processing ASSP-32(1984) Apr. No. 2, New York, USA "On the Application of Embedded Digit Training to Speaker Independent Connected Digit Recognition" by Rabiner et al–pp. 272–278.
Proceedings of The IEEE 1986 National Aerospace and Electronics Conference NAECOn 1986– Vol. 3, "Software Methodology For Automated Recognition Training(SMART)" by Barry et al. pp. 799–802.
Review of the Electrical Communications Laboratories vol. 34 No. 3, 1986 Tokyo, Japan "SPLIT-Based Speaker-Independent Isolated Word Recognition Using Multiple Templates" by Sugamura et al–pp. 335–342.

*Primary Examiner*—Dale M. Shaw
*Assistant Examiner*—David D. Knepper
*Attorney, Agent, or Firm*—Nixon & Vanderhye

[57] ABSTRACT

A speech recognition system comprises a recogniser (2) for receiving speech signals from users. The recogniser (2) compares each received word with templates of words stored in a reference template store (3) and flags each template that corresponds most closely to a received word. The flagged templates are stored in a template store (11). The recogniser (2) compares the speech pattern from a given user of a second utterance of a word for which a flagged template is already stored in the template store (11) with the templates stored in the reference template store (3) and with the flagged templates in the template store (11), so as to produce a second flagged template of that word. The second flagged templates are also stored in the template store (11). Sifting means (21) analyse a group of flagged templates of the same word, and produce therefrom a second, smaller group of templates of the word. These templates are stored in another template store (22).

11 Claims, 1 Drawing Sheet

SPEECH RECOGNITION

This invention relates to a speech recognition system, and to a method of constructing templates for use in recognising speech.

In known speech recognition systems, words uttered are subjected to known pattern recognition techniques, and, if correspondence with a known word is found, suitable coded signals are generated identifying the word. Correspondence is generally determined by generating signals or "scores" indicating the degree of similarity with stored patterns corresponding to known words, the word having the best score being deemed to be the word uttered.

This type of technique suffers from the disadvantage that the success rate of identifying words is largely dependent upon the quality of the stored patterns (templates) of the words. The usual way of building template sets of words is to generate these from a large number of spoken versions of the words; that is to say by asking a large number of people to speak the words, and to analyse the resultant speech patterns. The words are input by reading aloud a list of the words. Alternatively, each of the input people is asked to repeat the words of a spoken list. In either case, the words are uttered in a "forced" mode rather than in a "free" mode (that is to say when the words are used in their proper context). It has been found that many speakers pronounce words slightly differently in these two modes, so by storing templates of words spoken in the "forced" mode, and subsequently comparing these templates with the speech patterns of the same words spoken in the "free" mode, can lead to a reduced success rate in word identification.

The present invention provides a speech recognition system comprising analysis means for receiving speech signals from users, for comparing each received word with stored templates of words, and for flagging each template that corresponds most closely to a received word, a template store for storing flagged templates and sifting means for analysing a group of flagged templates of the same word and for producing therefrom a second, smaller group of templates of that word, wherein the analysis means is such as to compare the speech pattern from a given user of a second utterance of a word for which a flagged template is already stored in the template store with the said stored templates and with the flagged templates in the template store so as to produce a second flagged template of that word, said second flagged template being stored in the template store.

Advantageously, the system further comprises output means for presenting messages to users, the output means being constituted by a speech synthesiser, a loudspeaker, and a parameter store containing representations of words to be output. The system may also further comprise an audio store for storing the audio signals of words input by users.

In a preferred embodiment, the system further comprises another template store upstream of the sifting means, and a further template store downstream of the sifting means, said another template store containing all the flagged templates of a given number of users, and said further template store containing the reduced number of templates for that group of users which result from the sifting process.

The invention also provides a method of constructing templates for use in speech recognition, the method comprising the steps of analysing speech signals from a plurality of users to construct at least one template for each word input by each user, and means for sifting said templates to construct therefrom a set of representative templates for each of said words, wherein each user inputs all the words of a given list of words in a 'forced' mode, and then inputs at least some of the words of the list in a 'free' mode by answering a series of questions.

Advantageously, each word input in the 'forced' mode is compared with all the templates of the words in the list, these templates being stored in a first template store, the analysis means being such that the template that corresponds most closely to each word spoken in the 'forced' mode is flagged and stored in a second template store. Preferably, the analysis means compares each word spoken in the 'free' mode with all the templates stored in the first and second template stores, and flags and stores the template that corresponds most closely to each word spoken in the 'free' mode in the second template store. Conveniently, all the templates of a given number of users are stored in a third template store prior to the sifting process, and wherein the templates constructed by the sifting process are stored in a fourth template store.

In a preferred embodiment, the sifting process comprises the step of comparing each template in the third template store with all the templates of the same word, and with all the templates of any other word associated with said first-mentioned word in a predetermined manner, the sifting process being such that the templates of a given word stored in the fourth template store are representative of a maximum number of the templates of that word stored in the third template store and unrepresentative of any other template stored in the third template store.

One embodiment of the invention will now be described, by way of example, with reference to the accompanying drawings, in which.

Figure 1:
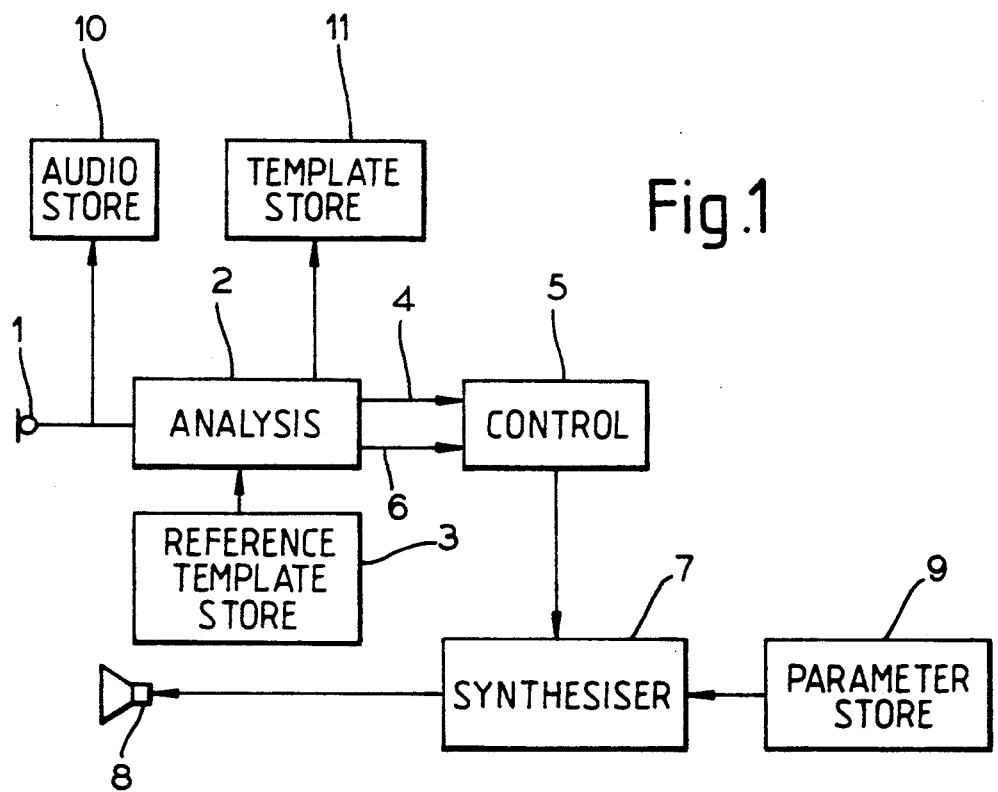
FIG. 1 is a block diagram of a speech recognition apparatus.

Referring to the drawings, FIG. 1 shows a speech recognition apparatus in which speech from a user is received by a microphone 1 connected to a speech recogniser 2. The recogniser 2 compares received words with the contents of a reference template store 3 which contains representations of a repertoire of words which it is desired to recognise.

Any of a number of conventional recognition algorithms may be used for this comparison, and these will not therefore be discussed in detail. By way of example, the "VOTAN" recogniser card produced by Votan Inc. for use with an IBM PC microcomputer might be employed.

The recogniser 2 compares a received word with each of the stored representations, and produces for each a similarity signal or "score" which indicates the closeness of fit between the two. Normally, the word whose stored representation has the best score is the one "recognised" and a corresponding coded signal is passed via a line 4 to a control unit 5, which could for example be the aforementioned IBM computer, for onward transmission or to initiate further action. For example, the control unit 5 can respond by generating a message back to the user via a speech synthesiser 7 and a loudspeaker 8. The synthesiser 7 has a parameter store 9 to enable it to generate appropriate words to be sent to the user. A further line 6 is provided between the recogniser 2 and the control unit 5, this further line being used (in a manner described below) when two or more stored representations have the same or similar scores.

All the words spoken by the user are stored in an audio signal store 10, which may be, for example, a tape recorder. After the recogniser 2 has compared each received word with each of the stored representations, and has "recognised" a word, the speech pattern (or template) of that word is stored in a template store 11. Each template stored in the template store 11 is flagged to indicate which word it is.

In use, a user first speaks a list of words, either by reading from a list or by repeating a list of words generated by the synthesiser 7. During this "forced" mode, each spoken word is compared with all the stored representations in the reference template store 3, and the template initially flagged to correspond to the best match is stored in the template store 11, as described above. After all the words in the list have been spoken in the "forced" mode, the user is asked to respond to a series of questions generated by the control unit 5 and "spoken" by the speech synthesiser 7. The control unit 5 generates these questions via suitable software, and the questions are designed to elicit one-word answers from the user, these words being from the list. In this way, the user speaks words from the list more in context, that is to say in the "free" mode. Whenever the user gives an answer, that word is compared, by the recogniser 2, with all the stored representations in the reference template store 3 and with all the templates in the template store 11. It then stores the template of that word, suitably flagged to correspond to the best match, in the template store 11.

The entire process is then repeated with a large number of other users. In each case, each spoken word (in either the "forced" mode or the "free" mode) is compared with all the templates in both the reference template store 3 and the template store 11.

Figure 2:
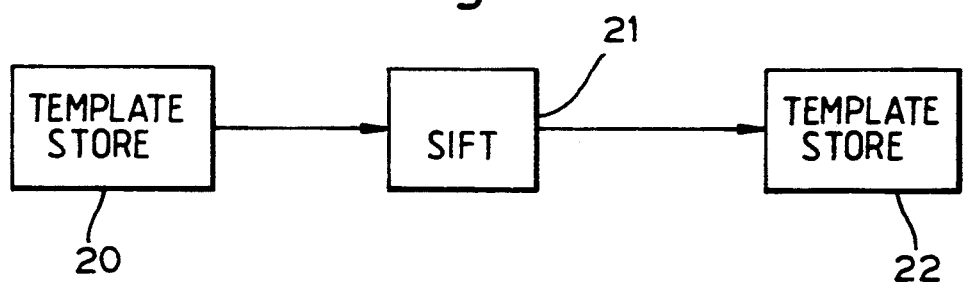
FIG. 2 is a block diagram of sifting apparatus.

When a sufficiently large number of templates have been stored (usually 1000 or more), these can be analysed to provide an improved initial template set. This is accomplished as described below with reference to FIG. 2, which shows schematically a template store 20 which contains all the templates of, say, 30 male users and 30 female users. The templates of each group of 60 templates of the same word are then analysed in a sifter 21 to determine which of the templates are the best. To do this, each template is compared with all the templates of the same word, and with all the templates of any other word in the same node. (A node is a group of words which are linked together as being probable answers to a given question—for example "yes" and "no" belong to one node, and a series of numbers belongs to another node.) The sifter 21 uses a conventional algorithm which picks out six male templates and six female templates as the best for each word. This is accomplished by testing each template against all other templates of the same node group in such a manner that the twelve chosen templates are representative of a maximum number of the templates of correct words, and are unrepresentative of any incorrect words. In this way, the sifting process reduces the number of templates from 2×30 to 2×6. It should be noted that it is not possible to use a single template to recognise a given word, in view of the fact that different speakers give significantly different speech patterns depending upon their accents and physiology. It has been found that six templates for each set gives satisfactory recognition accuracy.

Obviously, where there are more than 60 original users templates stored in the template store 11, it will be necessary to modify the sifting process. One way of doing this would be to have a plurality of sets of 60 (2×30) templates, each of which is reduced to sets of 12 (2×6) templates, and then to make further sets of 60 (2×30) templates from the sets of 12 (2×6) templates for further runs through the sifter 21. Alternatively, once a reduced set of 12 (2×6) templates has been produced, all the other templates can be compared with this reduced set to see whether the word concerned is correctly recognised. The templates of unrecognised words can then be used to modify the original reduced set by a further sifting process.

The entire sifting process is carried out for each of the words stored, so that finally each word to be recognised has a set of 2×6 templates. These templates have an increased success rate in subsequent word identification processes, because the original templates include templates of words spoken in the "free" mode.

If, during the initial comparison process (in either the "forced" mode or the "free" mode), the recogniser 2 gives two scored representations the same score or similar scores, the result is ambiguous, and a signal indicating this is passed, via the line 6, along with codes for both words, via the line 4, to the control unit 5 (see FIG. 1). The control unit 5 responds by generating a message back to the user via the speech synthesiser 7 and the loudspeaker 8.

This message has the form of "Did you say X" where X is the word whose representation stored in the reference template store 3 gave rise to the better score (or, if the two scores were identical, one of the two selected at random); and awaits a reply.

If the user replies "Yes" (or "No") this is recognised by the recogniser 2, and signalled to the control unit 5 which, in the event of a Yes proceeds as if X had been identified originally. In the event of a "No", a further message is issued via the synthesiser 7, viz "Did you say Y". Again the user response is analysed and if Y is confirmed, recognition is deemed complete. If the user again replies "No", the control unit 5 then initiates generation of a request for repetition (although in principle of course a third choice could be offered). This method of resolving ambiguity is described in greater detail in GB Patent Specification no. 2192746.

A particularly convenient way of arranging for users to provide a required group of words in both the "forced" and "free" mode is by using an automated telephone competition. For example, one competition may relate to Telephone Banking, in which case each caller would be asked to repeat a list of words generated by the synthesiser 7 from the parameter store 9. This list may comprise the words "one", "two", "three", "four", "five", "six", "seven", "eight", "nine", "zero", "oh", "nought", "current", "deposit", "savings", "Visa", "Access", "statement", "mini-statement", "transfer", "chequebook", "balance", "help", "pounds", "pence", "full", "yes", "no", and "stop".

As mentioned above, these words would be repeated by each caller so as to generate a series of the "forced" mode templates. The control unit 5 would then instruct the synthesiser 7 to put a series of questions to the caller, these questions being designed to elicit one-word answers from the list. In order to ensure a suitably high number of entrants (and hence a sufficiently large number of template-generating users), it is advisable for the competition to offer a prize or prizes. The audio store 10 is useful in weeding out spurious inputs, for example words deliberately incorrectly input.

We claim:

1. A method of constructing templates for use in speech recognition, the method comprising the steps of:

analysing speech signals from a plurality of users to construct at least one template for each word input by each user, and constructing from said templates a set of representative templates for each of said words, wherein during said constructing step each user inputs all the words of a given list of words in a "forced" mode, and then inputs at least some of the words of the list in a "free" mode by answering a series of questions.

2. A method as in claim 1, wherein:

each word input in the "forced" mode is compared with all templates of the words in the list, these templates being stored in a first template store, the analysing step identifying the template that corresponds most closely to each word spoken in the "forced" mode and storing such identified template in a second template store.

3. A method as in claim 2, wherein the analysing step compares each word spoken in the "free" mode with all the templates stored in the first and second template stores, and identifies and stores the template that corresponds most closely to each word spoken in the "free" mode in the second template store.

4. A method as in claim 3, wherein:

all the templates of a given number of users are stored in a third template store prior to the constructing step, and the templates identified during the constructing step are stored in a fourth template store.

5. A method as in claim 4, wherein:

the constructing step includes the step of comparing each template in the third template store with all the templates of the same word, and with all the templates of any other word associated with said first-mentioned word in a predetermined manner, the constructing step being such that the templates of a given word stored in the fourth template store are representative of a maximum number of the templates of that word stored in the third template store and unrepresentative of any other template stored in the third template store.

6. Apparatus for generating a set of speech templates to be used in subsequent speech recognition processes, said apparatus comprising:

means for generating first speech templates in a "forced" mode where a human speaker is prompted directly to speak a given word;

means for generating second speech templates in a "free" mode where a human speaker is induced to speak the same given word but without direct request for same; and means for combining said first and second speech templates into a common set of speech templates for subsequent use in speech recognition processes.

7. Method for generating a set of speech templates to be used in subsequent speech recognition processes, said method comprising the steps of:

generating first speech templates in a "forced" mode where a human speaker is prompted directly to speak a given word;

generating second speech templates in a "free" mode where a human speaker is induced to speak the same given word but without direct request for same; and combining said first and second speech templates into a common set of speech templates for subsequent use in speech recognition processes.

8. Apparatus for constructing a set of speech-representative templates, said apparatus comprising:

prompt means for generating an output prompting a user to speak a word; wherein the prompt means is operable to prompt the user:

(a) in a "forced" mode, by indicating directly the word the user is to speak, and;

(b) in a "free" mode, by indicating a context which is calculated to induce the user to speak that word;

input means for receiving a word input by a user;

means for producing a template from a thus input word; and template store means for storing a thus-produced template, whereby the template store may store, for each word, templates corresponding to both "forced" and "free" modes.

9. Apparatus according to claim 8, in which the prompt means in a speech synthesizer, operates in the "forced" mode to utter the word the user is to speak, and in the "free" mode to utter a question to which the said word is calculated to form the answer.

10. Apparatus according to claim 8 or 9 for constructing a set of speaker-independent templates, the apparatus being arranged to receive input words from a plurality of users and store a corresponding plurality of templates, the apparatus further comprising:

means connected to said template store means, for selecting a representative subset of said plurality of templates and for storing said subset of templates.

11. Apparatus according to claim 8 or 9 further comprising:

speech recognition means for identifying input words, and for allocating to thus-identified input words, data indicating their identity.

* * * * *